Oct. 2, 1928.  
W. P. DREAPER  
1,685,775  
APPARATUS FOR FILTERING SOLUTIONS USED IN THE  
MANUFACTURE OF ARTIFICIAL SILK AND THE LIKE  
Filed June 2, 1923
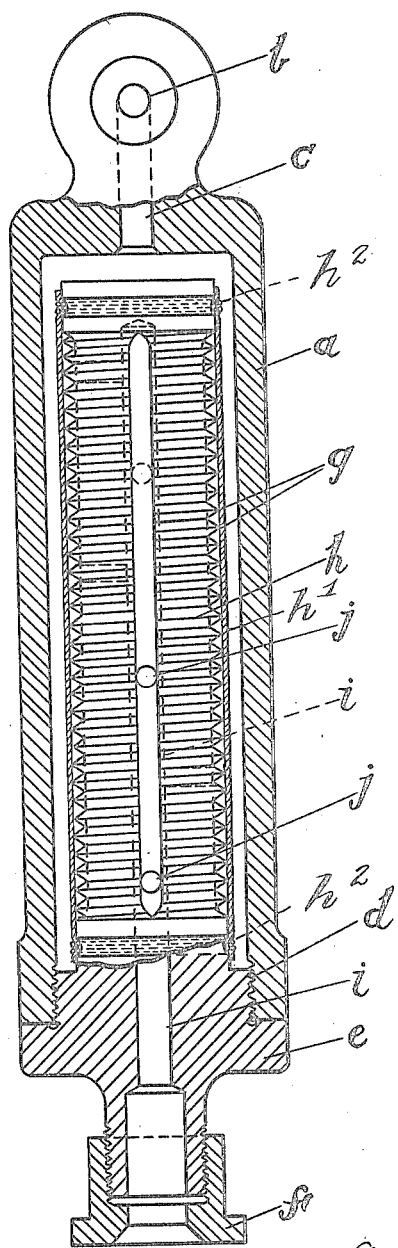

Patented Oct. 2, 1928.

1,685,775

UNITED STATES PATENT OFFICE.

WILLIAM PORTER DREAPER, OF HEMPSTEAD HEATH, LONDON, ENGLAND.

APPARATUS FOR FILTERING SOLUTIONS USED IN THE MANUFACTURE OF ARTIFICIAL SILK AND THE LIKE.

Application filed June 2, 1923, Serial No. 643,124, and in Great Britain June 22, 1922.

In the manufacture of artificial silk and the like products such as staple fibre a so-called candle filter is often used to finally filter the solution of cellulose or other material just before the said solution passes to the jet under the required pressure, and is then formed into filaments, ribbon or the like by well known means.

I now find that more satisfactory and regular results than hitherto, can be obtained and a more perfect and even filtration of the solution causing less disarrangement to the layers of filtering fabric used, especially when considerable pressure is required for filtering by using a type of filter or fabric holder hereinafter described with the accompanying drawing showing sectional elevation of my invention.

My invention comprises the usual outer casing $a$, of any convenient material such as ebonite of sufficient strength to withstand the pressure at which the solution is delivered to the filter, and if desired a suitable relief valve may be attached to the outer filter casing so that the pressure may not exceed a predetermined amount, or the said outer casing $a$, may be reinforced in any suitable manner.

The aforesaid outer casing $a$, has a swivel connection $b$, through which the solution enters at $c$, into this outer casing. Said casing $a$, is directly screwed or otherwise secured at $d$, to a spinning jet, and its attachment $e$, which in turn is provided with a screw cap $f$, as shown in the accompanying drawing.

The outer casing $a$, can easily be removed from the spinning jet and its attachment $e$, for cleaning purposes, and for replacing the filtering fabric which is wound or otherwise attached to the corrugated surface $g$, of the filtering member $h$, integral with the spinning jet and its attachment $e$.

The filtering member $h$, has a central duct $i$, for the purpose of holding the enlarged end of a glass or other tube, which serves to carry the filament solution away from the jet itself.

The solution enters into the outer part of the filter and now passing through the filter cloth $h^1$, which latter is secured at its respective ends to the filtering member $h$, by a band $h^2$, or the like as shown in dotted lines in the accompanying drawing, and said solution is then collected and passed into the central duct $i$, through the communicating vents $j$, the latter being placed at a suitable distance apart so that they collect the solution from the corrugated or other surface $g$, on which the filtering fabric $h^1$, is wound directly.

The above described filtering member $h$, is attached to the outer casing $a$, as hereinbefore described, so that the solution from the central duct $i$, passes directly to the glass or other tube in which the jet is mounted.

Under these conditions any increased pressure merely presses the filter cloth $h^1$, on to the surface of the filtering member $h$, instead of away from it as in the ordinary so-called candle filter, with the result that there is no chance of the solution being imperfectly filtered by passing through the folds or joints in the filtering medium which may happen when the fabric is forced away from the surface of the filtering member $h$, in ordinary practice.

The surface of this filtering member $h$, on which the filtering textile fabric $h^1$, is wound, may be corrugated or grooved or have a screw thread turned on it over the area of actual filtration so that the effective filtering surface may be conveniently increased, provided that at the same time suitable drainage ducts are provided to deliver the solution to the collecting passages which deliver the solution to the inner duct and then to the jet from which the solution is expressed in say filament or ribbons as in ordinary practice.

I do not wish to be limited to the exact details of construction as herein described and shown as these may be varied within the limits of the appended claim and without departing from the spirit of my invention.

I claim:

A filter for use in the manufacture of artificial silk having in combination a removable casing, a swivel connection integral therewith, a filtering member within said casing being secured thereto at one end, a central duct in said filtering member terminating at the base, a spinning jet in direct communication with said central duct, a plurality of transverse vents in said filtering member, a circumferential groove formed at the respective ends of said filtering member, and a textile fabric surrounding said filtering member, being secured at each end around the circumferential grooves.

WILLIAM PORTER DREAPER.